No. 869,492. PATENTED OCT. 29, 1907.
W. H. JOYNER.
STAIR ROD FASTENER.
APPLICATION FILED FEB. 19, 1907.
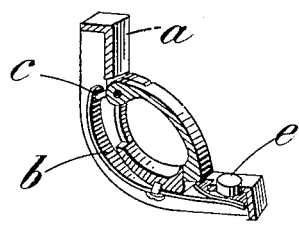
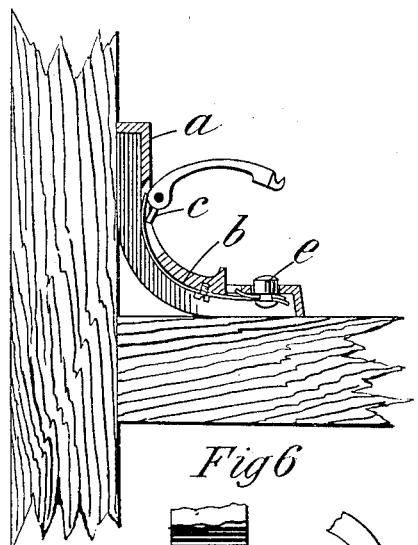
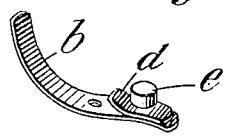
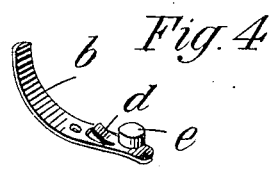
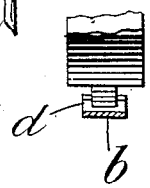
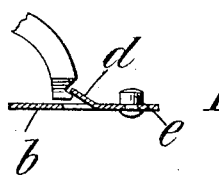
WITNESSES
INVENTOR
William Henry Joyner

UNITED STATES PATENT OFFICE.

WILLIAM HENRY JOYNER, OF ST. MARGARET'S-ON-THAMES, ENGLAND.

STAIR-ROD FASTENER.

No. 869,492.      Specification of Letters Patent.      Patented Oct. 29, 1907.

Application filed February 19, 1907. Serial No. 358,322.

*To all whom it may concern:*

Be it known that WILLIAM HENRY JOYNER, a citizen of England, residing at 5 Barronsfield road, St. Margaret's-on-Thames, in the county of Middlesex, England, have invented new and useful Improvements in Stair-Rod Fasteners, of which the following is a specification.

My invention relates to stair rod fasteners having the front portion thereof hinged to permit of the stair rod being inserted from the front instead of sidewise as with solid fasteners, and has for its object improvements in those of such fasteners which have a spring catch to secure the hinged portion in its closed position and in which said hinged portion is raised and held in its open position when released by spring pressure.

My invention is carried into practical effect by securing in the recessed back of a stair rod fastener a flat spring having holes therein to permit of the passage of screws through it when such are used for securing the fastener in position. One end of this spring presses upon the extended knuckle of the hinged portion of the fastener and so tends to raise the latter and support it in its open position, while the opposite end carries or operates a tongue or the like engaging the free end of the hinged portion of the fastener when in its closed position; such tongue or other means for securing the hinged portion of the fastener being operated to release the hinged portion by a pressure button or other like means.

My invention will be more readily understood and be more readily carried into practical effect if reference be made to the accompanying drawings which illustrate a simple method of carrying the same into practical effect.

Of these drawings, Figure 1. is a side sectional view of a stair rod fastener fitted with means for actuating and securing the hinged front, and showing same closed. Fig. 2. is a side sectional elevation of the fastener showing the hinged front open, and Figs. 3. 4. 5. and 6. details hereinafter referred to.

As so shown the stair rod fastener $a$ has secured, by a screw or like means, in the recessed or hollow back thereof a spring blade $b$ one end of which is adapted to press upon an extension $c$ of the knuckle of the hinged portion of the fastener so tending to raise same when released and hold it in its raised position; while the opposite end of said spring either has attached to it as shown by Fig. 3. or pressed out of it as shown by Fig. 4. a lug or tongue $d$ which, when the hinged front of the fastener is closed, engages with a notch in the end of said hinged front, as shown by the side and front enlarged detail elevations Figs. 5. and 6. respectively, and so secures same in its closed position.

That end of the spring provided with the lug or tongue $d$ has secured to it a button $e$ which projects up through an opening in the fastener and constitutes a means whereby the lug or tongue may be forced out of engagement with the notched end of the fastener front. If preferred, however, the button may simply rest on the end of the spring, and in that case it should be provided with a flange at its lower end to prevent it from passing completely through the opening in the fastener.

Having now particularly described and ascertained the nature of my said invention, and in what manner the same is to be performed, I declare that what I claim is:—

1. A stair rod fastener comprising a hollow body having a hinged portion and a spring in said body and secured thereto intermediate its ends, said spring having one end engaging with an extension of the hinged portion to raise the said portion when released and having a lug on its other end engaging with the opposite end of the hinged portion to keep said hinged portion closed and a button on the spring for moving the lug out of contact with the hinged portion.

2. A stair rod fastener comprising a hollow body having a hinged portion and a spring in said body and secured thereto intermediate its ends, said spring having one end engaging with an extension of the hinged portion to raise the said portion when released and its other end engaging with the opposite end of the hinged portion to keep said hinged portion closed.

In testimony whereof he has signed his name to this specification in the presence of two subscribing witnesses.

WILLIAM HENRY JOYNER.

Witnesses:
    PERCY WILLIAM MATTHEWS,
    FREDERICK JAMES BINGHAM.